June 1, 1965 M. P. BUDNEY ETAL 3,186,257
JIG BORER
Filed Jan. 13, 1961 4 Sheets-Sheet 3
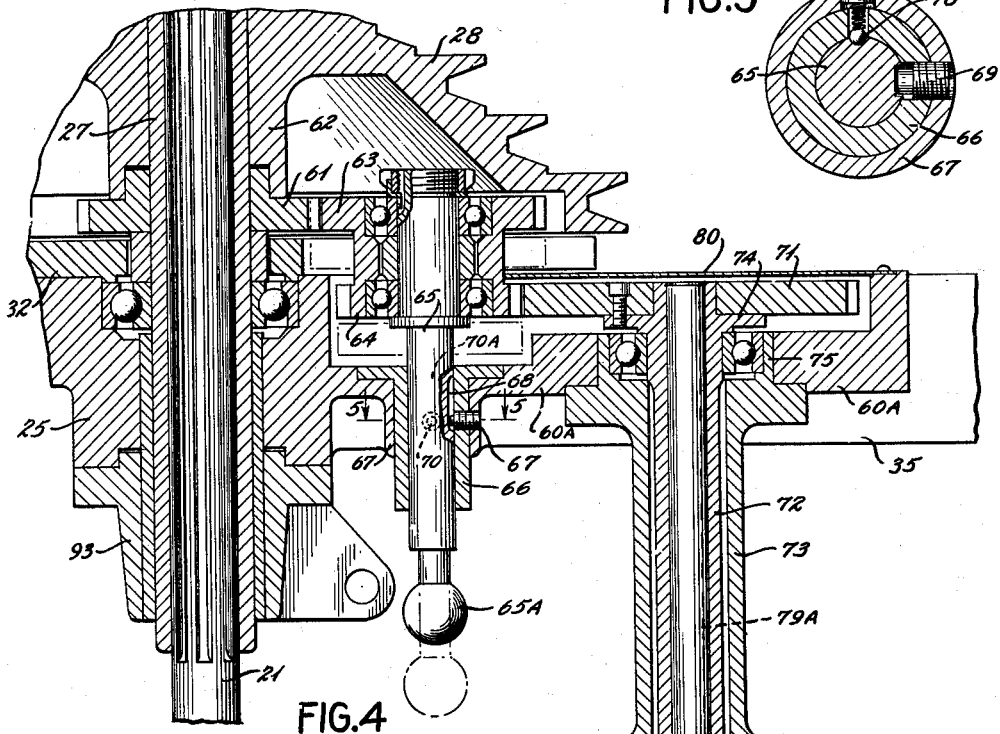
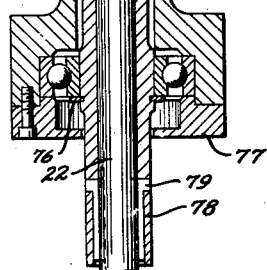
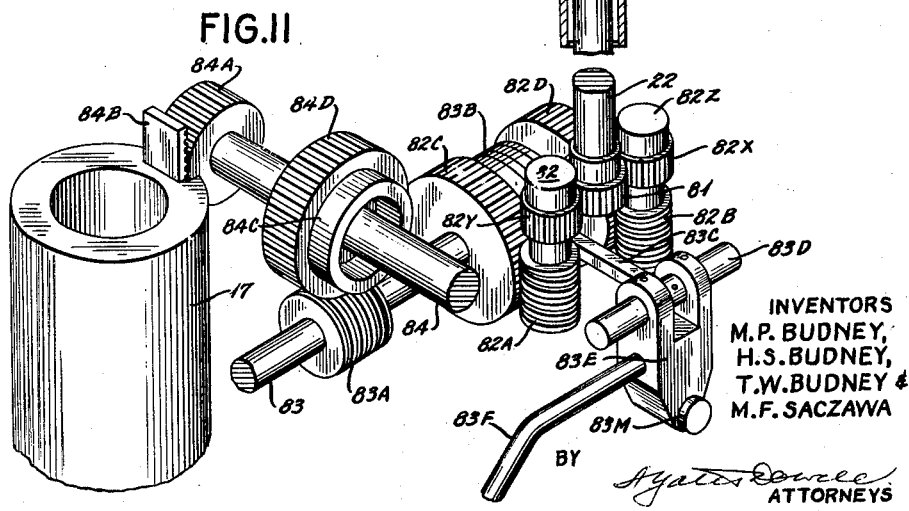
INVENTORS
M.P. BUDNEY,
H.S. BUDNEY,
T.W. BUDNEY &
M.F. SACZAWA
BY
ATTORNEYS

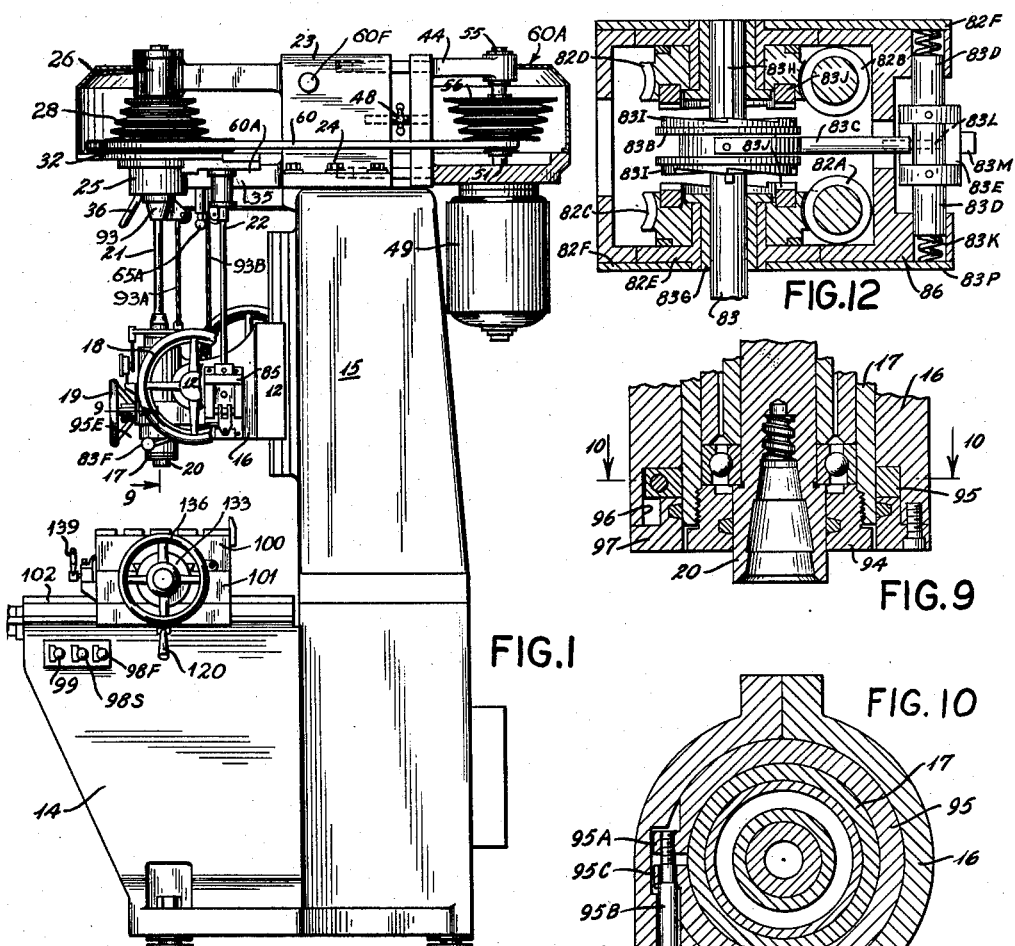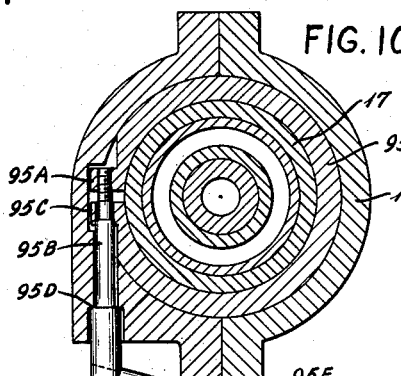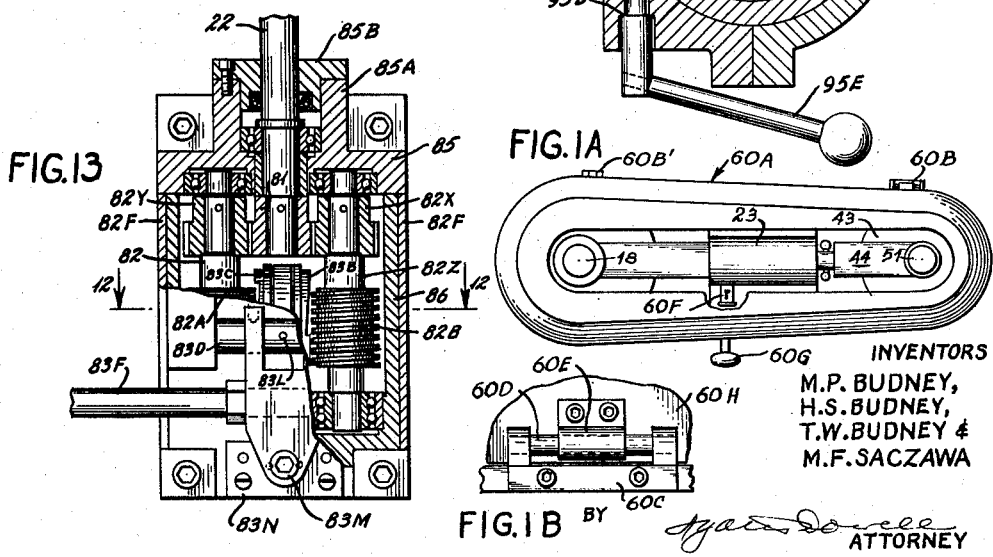

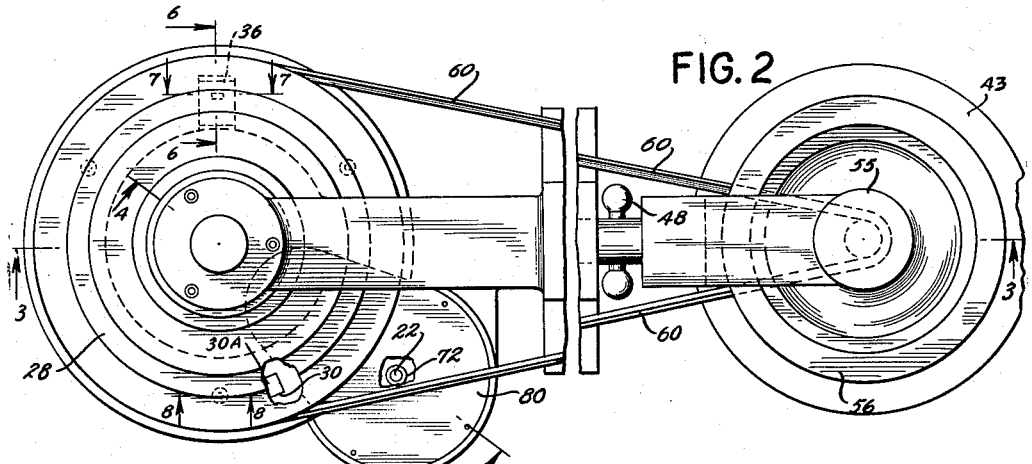
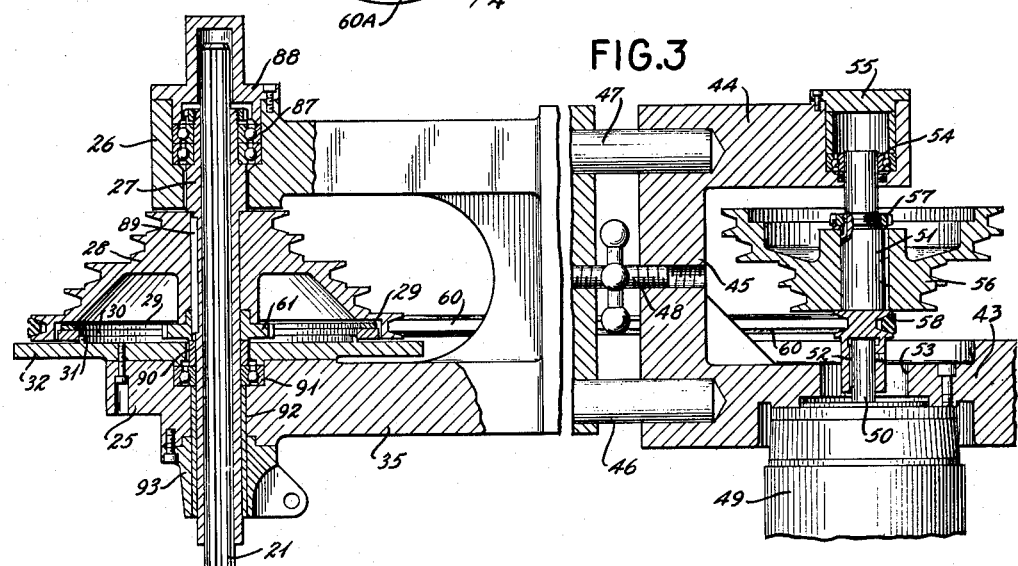
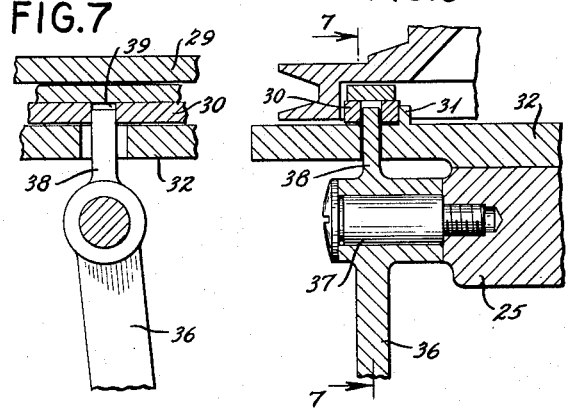
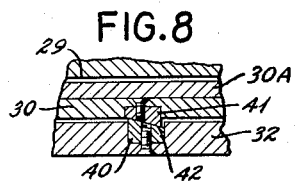

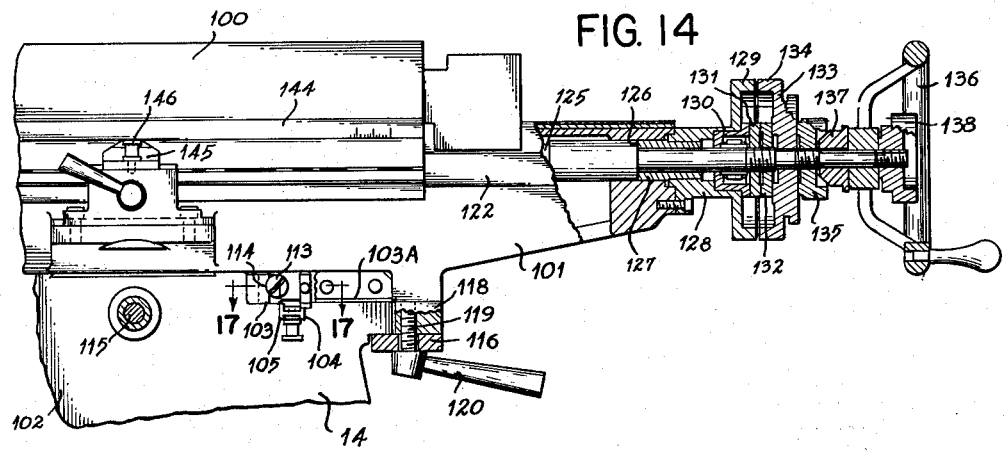
FIG. 14
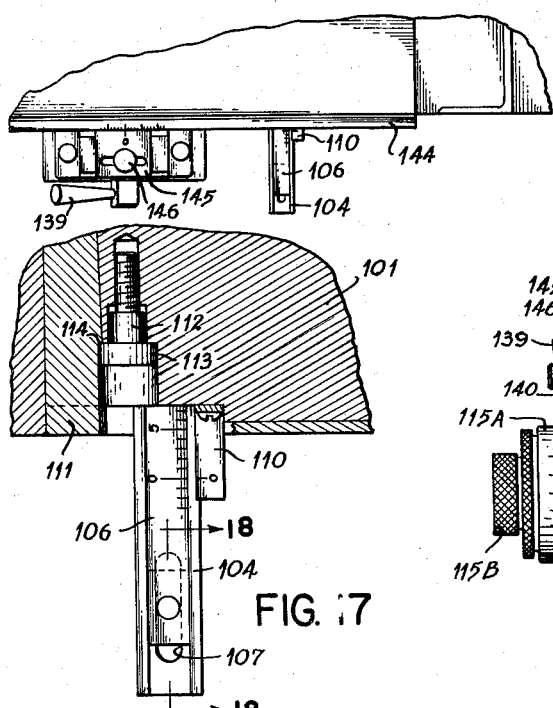
FIG. 15
FIG. 17
FIG. 18
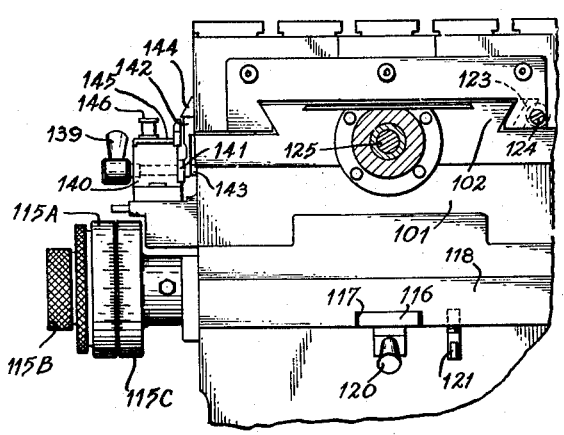
FIG. 16
INVENTOR
M. P. BUDNEY
H. S. BUDNEY
T. W. BUDNEY
M. F. SACZAWA
BY
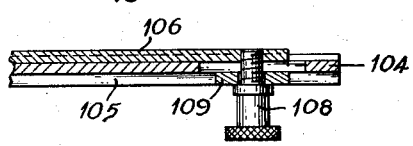
ATTORNEY

United States Patent Office 3,186,257
Patented June 1, 1965

3,186,257
JIG BORER
Michael P. Budney, Berlin, Henry S. Budney and Thaddeus W. Budney, Newington, and Matthew F. Saczawa, Wethersfield, Conn., assignors to Atlantic Machine Tool Works, Inc., Newington, Conn.
Filed Jan. 13, 1961, Ser. No. 82,547
3 Claims. (Cl. 74—665)

The present invention relates to a jig borer and more particularly to a drive for the spindle and spindle feed which provides for substantial vertical adjustment of the boring tool without excessive height in the jig borer.

Heretofore, jig borers have been designed and built at substantial expense and it has been difficult to obtain accurate work without having extremely large and heavy construction in the supporting base, the column, transmission housing and gearing mechanism for driving the spindle and down feed shaft. Also, the expense of the transmission and variable speed gearing in the overhead driving structure has resulted in a high over-all cost.

An object of the present invention is to overcome the excessive weight and cost of jig borers and to provide maximum accuracy and production at a minimum cost.

Another object of the present invention is to produce an inexpensive jig borer capable of high precision work and of performing most boring functions.

A further object of the invention is to provide an inexpensive drive structure for the spindle and the feed of a jig borer.

A still further object is to provide a clamp for holding the quill in a fixed position to permit use of the jig borer as a milling machine of extreme accuracy.

Another object of the invention is to provide means for accurately measuring the displacement of the work relative to the spindle and for adjusting the zero position or starting point for measurement.

Other and further objects will be apparent as the description proceeds and upon reference to the accompanying drawings, wherein:

FIG. 1 is a right side elevation of a jig borer with parts broken away and showing the novel motor and belt drive supported on the top of the column with the guard therefore in vertical section, and showing the control switches;

FIG. 1A, a plan view of the pivoted guard in operative position protecting an operator from the belt drive;

FIG. 1B, a detail elevation of a hinge pivoting the guard at the left side to the top of the column;

FIG. 2, a top plan view of the belt drive and motor supporting structure with the belt guard omitted and with parts broken away to show part of the brake shoe and the location of the down feed shaft;

FIG. 3, a vertical section taken substantially on line 3—3 of FIG. 2, showing the belt drive for the spindle with the motor support including the telescoping relation of the spindle shaft connection to the driven pulley and showing the brake;

FIG. 4, a fragmentary vertical section taken substantially on broken line 4—4 of FIG. 2 through the gear train showing how the speed is reduced between the hollow spindle drive shaft and the down feed shaft and showing the shifting handle for engaging and disengaging the intermediate gears of the gear train for drive and non-drive of the down feed shaft;

FIG. 5, a horizontal section taken on the line 5—5 of FIG. 4 showing the ball detent for retaining the gear shifting handle in drive relation;

FIG. 6, a fragmentary section taken substantially on line 6—6 of FIG. 2 showing the depending brake operating lever for stopping the spindle belt pulley and thereby the mechanism drivingly connected thereto;

FIG. 7, a fragmentary detail taken substantially on line 7—7 of FIGS. 2 and 6, showing the brake operating handle in elevation and showing the connection to the brake shoe with the brake shoe lining in non-braking relation;

FIG. 8, a fragmentary section taken substantially on line 8—8 through one of the three cooperating cams which react between the brake shoe and its supporting plate to provide for the braking action and showing the brake in non-braking relation;

FIG. 9, a fragmentary vertical section taken substantially on line 9—9 of FIG. 1 through the lower end of the quill and showing the quill clamp;

FIG. 10, a horizontal section taken substantially on the line 10—10 of FIG. 9 showing the clamping ring and its mounting in the quill housing and showing the clamping ring operating handle;

FIG. 11, a diagrammatic perspective of feeding mechanism including worm gearing and clutch arrangements located in a detachable gear box in the quill housing for obtaining the feeding movement of the quill;

FIG. 12, a horizontal section of the worm and worm gear feed reversing drive of the removable gear box taken substantially on line 12—12 of FIG. 13 through the axis of the fine feed shaft and showing the clutch arrangement of the fine feed shaft to a selected one of the worm gears;

FIG. 13, a right side elevation of the exposed side of the feed reversing gear box with parts broken away showing the bearing arrangement for the shafts of the feed reversing gear box of FIG. 12;

FIG. 14, a fragmentary front elevation of the cross slide and table showing the clutching arrangement for driving the table feed screw and for connecting the dials to the table feed screw and also showing the position indicating scales and their adjusting and also showing the clamping means to retain the cross slide in fixed position;

FIG. 15, a fragmentary plan showing the cross slide indicating position scale mounted on the base with the zero index cooperating therewith mounted on the cross slide and also showing the beveled table position indicating scale on the table and the zero index therefor mounted on the cross slide;

FIG. 16, a right end view of the cross slide and table showing the table feed screw shaft in section;

FIG. 17, a fragmentary enlarged horizontal section taken substantially on line 17—17 of FIG. 14, showing the cross slide zero index cooperating with the scale slidably mounted on the base and also showing the screw adjustable tapered gib for obtaining accurate guiding action of the cross feed; and FIG. 18, a fragmentary section taken substantially on line 18—18 of FIG. 17, showing the screw adjustment for zeroing the cross slide position indicating scale on the base.

Briefly, the invention is in a jig borer having supporting base, the cross feed and longitudinal feed table and the supporting column for the quill housing and the spindle drive and feed drive mechanism.

More specifically, one portion of the invention comprises a spindle drive shaft horizontally disposed U-shaped frame mounted on the top of the supporting column with its legs in a vertical plane and having an enlarged bight portion forming a base therefor and a motor supporting U-shaped frame horizontally disposed with its legs in a vertical plane extending away from the spindle drive shaft supporting frame. Vertically extending bearings in the free ends of the legs of the drive shaft supporting frame is an internally splined hollow spindle drive shaft which drivingly receives a splined vertical extension of a boring spindle. An upright stepped cone shaped V-belt receiving pulley keyed on the hollow spindle drive shaft in addition to driving the spindle by means of a belt also provides a brake surface for cooperation with a manually operable horseshoe-shaped brake shoe mounted on the lower leg. A gear train on the lower leg includes slidable intermediate gears which selectively drive a hollow down feed shaft which telescopically receives an upwardly extending feed shaft of the quill housing.

The motor supporting U-shaped frame is mounted by its bight portion for movement toward and away from the spindle down shaft supporting U-shaped frame. A bearing on the upper leg in vertical alignment with the shaft of a motor supported on the lower leg carries one end of a shaft carrying an inverted stepped cone-shaped V-belt pulley drivingly connected by a suitable V-belt to the upright cone-shaped pulley on the spindle drive shaft.

To move the quill vertically in the quill housing the upstanding feed shaft operates a helical gear meshing with two other spaced helical gears drivingly connected to worms, which worms drive worm gears freely rotatable on the fine feed shaft, the worm gears being selectively engageable with a sliding clutch element keyed to the fine feed shaft whereby the fine feed shaft can operate in feed or reverse feed direction.

Referring more particularly to the drawings, a base 14 supports a column 15 provided with the usual quill housing guide ways on which a quill housing 16 is slidably mounted for vertical movement. The quill housing carried the usual vertically adjustable quill 17 which is moved by means of the coarse feed hand wheel 18 and the fine feed hand wheel 19, which operate in the usual manner to move the spindle 20 rotatably supported in the quill 17. The spindle 20 is driven by a vertical splined extension 21 of the spindle 20. The automatic feed is obtained from upstanding feed shaft 22 rotatably supported in bearings in a gear box in the quill housing 16.

Mounted on the upper end of the column 15 is the driving transmission and motor-supporting arrangement, which includes a main horizontally disposed U-shaped frame arranged with its legs in a vertical plane and having an enlarged base portion 23 removably secured to the top of the column by bolts 24. Bearing bosses 25 and 26 on the free ends of legs of the main frame carry suitable antifriction bearings, rotatably supporting a tubular inwardly splined spindle drive shaft 27. Keyed on the tubular spindle drive shaft 27 is a hollow upright stepped cone shaped belt pulley which provides a radially extending brake-engaging surface 29 adjacent the bottom of the pulley while being spaced axially upwardly a sufficient distance to completely receive a horse shoe shaped brake shoe 30 with brake 30A thereon which engages the braking surface 29. The brake shoe 30 being of circular horse shoe shape is mounted for partial rotation around a horse shoe shaped circular rib 31 extending upwardly from a notched brake shoe supporting plate 32 which is mounted on the lower leg 35 by means of suitable screws.

To operate the brake, a vertically extending handle 36 is pivotally mounted on shouldered bearing screw 37 threaded into the left portion of the bearing retaining boss 25 so that the pivotal axis is substantially radial to the axis of the hollow shafts 27. The handle 36 has an integral upwardly extending projection 38 which passes through an elongated slot in the brake-supporting plate 32 and is loosely received in a slot 39 in the brake shoe 30 whereby oscillation of said handle 36 causes pivotal movement of the brake shoe 30. The brake supporting plate 32 is provided with a cam receiving recess in which a cam element 40 is removably secured and a similar cam element 41 is removably secured in a recess in the brake shoe 30, such cam elements 40 and 41 having inclined cam engaging surfaces 42 whereby rotation of the handle 36 causes rotation of the brake shoe 30, causing the brake shoe to move axially and to cause the brake lining 30A to engage the braking surface 29 of the upstanding cone-shaped pulley 28 to thereby stop the rotation of the hollow spindle drive shaft 27 and thereby stop the entire operation of the jig borer.

A U-shaped motor supporting frame having its legs 43 and 44 disposed horizontally in a vertical plane and connected by a bight portion 45 is provided with heavy guide pins 46 and 47 fixed to the motor supporting U-shaped frame by set screws or the like and slidably extending into elongated bores in the base support 23 of the main U-shaped frame whereby the motor supporting U-shaped frame may be rectilinearly movable toward and away from the main U-shaped frame, the motion being caused by a hand-operated turnbuckle type screw 48 having opposite handed threads at each end threaded into corresponding tapped apertures in the two U-shaped frames whereby positive adjusting movement may be obtained.

A two-speed electric motor 49 having its shaft 50 extending vertically is fixedly mounted by means of screws to the generally circular plate 43 forming the lower leg of the motor supporting U-shaped frame and keyed to such motor shaft 50 is a pulley shaft 51 tubular at one end telescopically receiving the motor shaft and retained in position by a key and a set screw, it being observed that a pulley shaft receiving opening 53 in the lower leg 43 permits assembly by axial insertion. The upper end of the shaft 51 is supported in an antifriction bearing 54 held in position by a sleeve engaging the outer race and a retaining cap 55, with the lower edge of the outer race engaging a shoulder and a lubricant sealing element being provided to retain lubricant in the bearing-receiving bore of the upper leg 44. A four-groove conical pulley 56 is keyed to an enlarged intermediate portion of the pulley shaft 51 and is retained in position by a nut 57 threaded onto an intermediate diameter threaded portion and engaging the hub of the four-groove pulley 56, the other end of such pulley hub abutting the flange of the integral pulley groove 58 of the shaft 51.

It will be apparent that a V-belt 60 extends between the spindle shaft pulley 28 and the motor shaft pulleys 58 and 56, the turnbuckle type screw 48 providing for reducing the space between such pulleys to permit the moving of the belt from one set of grooves to another, while the same turnbuckle provides for obtaining the proper tension of the V-belt 60.

The V-belt 60 and its drive pulleys 58 or 56 and driven spindle shaft pulley 28 are covered by a guard cover 60H as shown in plan view in FIG. 1A and shown in section in FIG. 1. This guard cover includes substantially semicircular ends connected by walls with a top wall having a longitudinal cutout for receiving the upper legs of the U-shaped frames and portions which project above the top wall. The opening in the top wall is sufficiently large to permit the cover 60H to pivot about hinges 60B, 60B'. It will be noted that each hinge 60B includes a yoke 60C which is fixed by means of screws to motor mounting plate 43 forming the lower leg of the motor supporting U-shaped frame and cooperating with the yoke is a pivot pin 60D which is fixed to the yoke 60C by tightly fitting into apertures in the arms of the yoke, the pin also passing loosely through the barrel of a hinge leaf 60E secured to the left side wall of the cover 60 by suitable screws. The hinge 60B' may be of the same type but is designed to prevent axial movement of barrel 60E so that the cover will be properly centered in operative position. It will thus be seen that applicants have provided a guard to prevent injury to any operator or to persons in the area of the machine adjacent the belt transmission while permitting ready adjustment of the belt by the axial movement of barrel 60E on pin 60D. To raise the cover a handle 60G is mounted on the left side of the guard and to retain the cover in raised position, a slide bolt 60F is provided which underlies the top wall of the cover and is received in a socket having a bayonet slot with a radially extending screw passing through the bayonet slot into the slide bolt so that the slide bolt may project out a sufficient distance for the lower edge of the wall to rest thereon to permit adjustment of the belt 60 by the adjusting device 48 and also to permit changing the position of the belt 60 from one pair of pulley grooves to a different pair. It will be evident that the slide bolt is spring pressed outwardly to open guard retaining position and is held to its inner position by the transverse portion of the bayonet slot engaging the radial screw.

The hub 62 of the spindle drive pulley 28 has a counterbore at its lower end which receives a hub portion of a gear 61 also keyed by key 89 to the shaft 21 and meshing with such gear is a first intermediate gear 63 integral with a second intermediate gear 64, said integral gears being rotatably supported by suitable anti-friction bearing means on a vertically extending slideable shaft 65 with the gears 63 and 64 spaced apart a greater distance than the thickness of the gear 61 and gear 71. A downwardly extending portion of the shaft 65 having a ball handle 65A is slideably mounted in a bushing 66 mounted in a boss portion 67 of the gear housing 60A. The shaft 65 is provided with a slot 68 which receives the end of a full dog set screw 69, preventing rotation of the shaft 65 while permitting limited axial movement thereof. A ball detent 70 mounted on the base 67 engages one of the two recesses 70A in shaft 65 to retain the shaft 67 and the intermediate gears 63 and 64 in the full line driving position or in the dotted line non-drive position. Cooperating with the second intermediate gear 64 is a large diameter feed takeoff shaft gear 71 fixed to a flange 74 of a hollow down feed shaft 72 by means of one or more screws extending through apertures in the down feed shaft gear 71 and into the flange 74. To rotatably support the shaft 72, a spool-shaped bearing support 73 is removably secured to the integral bottom housing 60A by any suitable means such as screws or the like and such spool-shaped bearing retainer supports the hollow shaft 72 for rotation while preventing axial movement, it being noted that the flange 74 is of smaller diameter than the cylindrical portion 75 and the opening receiving cylindrical portion 75 of the spool shaped bearing retainer permits assembly through the bottom of gear train housing 60A, the inner race of the upper bearing abutting the flange 74, while the inner race of the lower bearing is retained in position by a split ring 76 and the outer race is retained in position by a cap 77 held in position by suitable screws. The hollow down feed shaft 72 is provided with keyways 78 extending from an aperture through the wall of the tubular shaft spaced from the lower end of the shaft to the lower end of the tubular shaft receiving L-shaped keys 79 which engage in key slots 79A which extend the length of the hollow shaft 72 and are formed in the upper end of the upstanding feed shaft 22 to provide for sliding movement. A plate cover 80 closes the open top of the gear train housing 60A and extends under the periphery of the pulley 28 and into the space between idler gears 63 and 64, it being apparent that the spacing of intermediate gears permits vertical shifting from drive to non-drive relation without contacting the plate 80.

Upon reference to FIG. 11, rotation of the upstanding feed shaft 22 may cause movement of the quill 17 by means of a gear 81 fixed to shaft 22 and meshing with gears 82Y and 82X on shafts 82 and 82Z. Such shafts also carry worms 82A and 82B, respectively, which in turn mesh with gears 82C and 82D, respectively, which gears are freely rotatable on the usual fine feed shaft 83 which is rotatably mounted in the quill housing and manually operable by fine feed hand wheel 19. Fixed on the shaft 83 is a worm 83A which is constantly in mesh with a gear 84D freely rotatable on the coarse feed shaft 84 and connectable thereto by the usual axially movable clutch element (not shown) slideably keyed to the shaft 84 and engageable in the conical clutch element 84C, fixed to the gear 84D whereby engagement of the conical clutch element on the shaft 84 causes rotation of the shaft 84 when the gear 84D is rotated. Since the shaft 84 is connected to the usual spur gear 84A which meshes with the rack 84B mounted in the rack receiving groove of the quill 17, the quill 17 is moved when the shaft 84 is rotated, whether such shaft is rotated by the hand wheel 18 or by the gear train.

Since gears 82C and 82D are freely rotatable on shaft 83, it is necessary that one gear be clutched to the shaft 83 to cause rotation thereof in one direction and that the other gear remain freely rotatable. When rotation is required in the other direction, the other gear is clutched to the shaft 83 and the one gear would remain freely rotatable. Therefore, the gear arrangements 82A, 82C and 82B, 82D are reverse threaded or reverse handed, respectively, since the shafts 82 and 82Z rotate in the same direction.

A clutch element 83B is positioned between gears 82C and 82D and is slideably keyed to the shaft 83 and is moved axially thereon by a fork 83C which engages in the circumferential groove in the clutch element 83B and has the outwardly extending shank fixed to a rectilinearly slidable shaft 83D by a pin 83L, the shaft 83D being movable axially by a block 83E having a handle 83F extending therefrom to provide for manual operation by means of the ball on the end of such handle 83F.

Referring more particularly to FIGS. 1, 12 and 13, the upstanding feed shaft 22 carrying the gear 81 at its lower end is rotatably mounted in a cap member 85 by means of an upwardly extending boss 85A having a bore receiving an anti-friction bearing having its outer race abutting a shoulder at the bottom of the bore and its inner race abutting a flange on the shaft 22, a grease retaining packing 85B being mounted on the upper end of the boss 85A. The cap member 85 is removably secured to a skeleton frame 86. The skeleton frame has an opening at the top for receiving the gear 81 and the meshing gears 82Y and 82X and their shafts 82 and 82Z which are rotatably mounted by their upper ends in bearings in the cap 85 and mounted at their lower ends in the bottom of the skeleton frame 86, which structure permits assembly by axial insertion of the shafts 82 and 82Z with the gears thereon.

The gears 82C and 82D are rotatably mounted on the outer surfaces of the hub portions of flanged bushings 82E (FIG. 12), which flanged bushings are secured to removable side plates 82F. A flanged bushing 83G is provided in the flanged bushing 82E and on its inner surface rotatably supports the shaft 83, the clutch element 83B being slideably keyed by means of keyways 83H and a cooperating key to the shaft 83. The clutch member 83B carries ratchets 83I on each outer surface which cooperate with replaceable ratchet members 83J on the gears 82C and 82D. The fork member 83C causes the clutch member 83B to be moved axially into engagement with the ratchet elements on the corresponding gears to obtain clutching driving relation.

It will be noted that the rectilinearly movable shaft 83D is maintained in a neutral position by springs 83K which abut the ends of the shaft 83D and the side plates 82F of the skeleton frame 86. The shank of fork 83C is provided with an extension pin 83L which is received in a transverse bore in the rectilinearly movable shaft 83D and such shaft is moved by the block member 83E which is secured to the shaft by dog set screws and carries a ball detent housing 83M which has a spring-pressed ball which engages any one of three recesses in a removable plate 83N. The skeleton frame 86 with the gears, bushings and side plates is received in a recess in the quill housing 16 to substantially the line 83P so that the bushings 83G can receive the fine feed shaft as the fine feed shaft is inserted from the front of the machine. The shaft 22 is in alignment with the hollow down feed shaft 72 which provides for assembly by insertion of the skeleton frame with the gears thereon and thereafter insertion of the fine feed shaft 83 and then the insertion of the cap 85 with the gears suspended therefrom, or the entire structure can be assembled and the U-shaped motor support and the main U-frame support can be mounted in position from above, with the upper extension of the spindle shaft 21 being received in the hollow spindle drive shaft 27 and the upwardly extending feed shaft 22 being slideably received in the downwardly extending tubular shaft 72.

Upon reference to FIGS. 1, 3 and 4, the hollow inwardly splined shaft 27 is rotatably received in a pair of antifriction ball bearings 87 in the boss 26 in the upper leg portion of the main U-shaped frame, the inner races of such bearings abutting a shoulder on the shaft 27 and being secured by a nut threaded onto the shaft 27 while the outer races are retained in position by a hollow cap member 88 having a circumferential flange extending into the bearing receiving bore in the boss 26 and abutting the outer races. An upwardly extending hollow hub of cap 88 receives the extreme end of the upper splined portion of the spindle shaft 21, the splines of which spindle shaft are in driving relation within the shaft 27. The shaft 27 is provided with a key 89 and cooperating keyway which drivingly engages keyways in the gear 61 and the hub of spindle pulley 28. A spacing collar 90 abuts the hub of gear 61 and the inner race of a lower ball bearing 91, the outer race of which bearing is received in a bore in the hub 25 of the lower leg while a bushing 92 extends downwardly and additionally supports the hollow shaft 27, such bushing being held in place by the sprocket supporting boss 93, such boss being retained in position by suitable screws. The sprocket supporting boss 93 also serves the function of supporting the sprocket which supports the counterbalancing chain 93A connected to the quill 17. Another supporting chain 93B is connected to the quill housing and passes over a sprocket 93C and both chains are guided over other sprockets and are connected to counterbalancing means such as vertically movable weights in the hollow column 15. The splined upwardly extending spindle drive shaft 21 is positively connected to or integral with the spindle 20, which spindle is supported in suitable bearings in the quill 17, the lower bearing being shown and being retained by an outwardly threaded collar 94 which also provides a groove support for a seal between such collar and the spindle 20.

To support the quill and thereby the spindle in a fixed vertical position, a split clamping ring 95 is received in an annular recess 96 in the quill housing 16 with the split clamping ring being retained against vertical movement by a flanged collar 97 having a cylindrical portion thereof received in the annular recess 96 and substantially abutting the split clamping ring 95 while permitting adjustment, the collar 97 being secured in position by suitable securing screws. To operate the clamping ring, one lug 95A of such ring is threaded and threadedly receives the threads of a doubly shouldered screw 95B, with a small diameter shank portion of the screw abutting the shoulder of the other lug 95C while the second shoulder 95D abuts a shoulder in a counterbored bore in the quill housing 16. An operating handle 95E is fixed to the outer end of the shaft 95B, thereby providing for clamping action between the lugs 95A and 95C of the split ring 95 while maintaining the split ring against excessive rotational movement. This clamping ring can be inserted without requiring removal of the usual quill retaining cap and, therefore, provides a structure wherein the quill retaining cap can be integral, thereby reducing the cost of manufacture.

The motor 49 can be operated at two different speeds by control push buttons 98S and 98F to operate the motor 49 at a slow or fast speed, respectively, while a button 99 at the front of the group of electrical control buttons on the base 14 provides for stopping of the motor.

With the five speeds permitted by the five grooves in the belt pulleys 28 and 56 and the two speeds of the motor, it will be apparent that ten different speeds can be obtained and the feed can be interruped by the control shaft 65 so that none of the feed operating mechanism is rotated. When the feed control shaft 65 maintains the intermediate gears in driving relation the worm gears 82C and 82B are continuously rotated in opposite directions and by manipulation of the clutch 83B by handle 83F the feed shaft can be moved in either feeding or reverse feeding direction. Also, the feed can be accomplished manually by means of the coarse feed hand wheel 18 when its clutch is released or by the fine feed hand wheel 19 when clutch 83B is released.

The work is supported on the usual table 100 which is longitudinally movable on the cross slide 101, which cross slide is mounted for transverse movement on the base 14, but to assure greater accuracy in the operation tapered gib adjusting means are provided for preventing the longitudinal movement of the cross slide on the base and preventing lateral movement of the table on the cross slide.

The base 14 is provided with the central upstanding guide rib 102 and provided with depressed ways 103, 103A on each side of the upstanding guide while the cross slide 101 is provided with a groove receiving with the upstanding guide rib 102 of the base and the cross slide is provided with downwardly extending portions slidably cooperating with the ways 103, 103A. It will be noted that the ways 103 and 103A are spaced apart as in the usual practice and in the space between the right pair of ways 103 and 103A a scale support receiving groove 104 is provided and in such groove an H-shaped scale support 105 is mounted in fixed relation by any suitable means. A scale 106 is slidably mounted in the upper portion of the H-shaped section 104. An elongated slot 107 is provided in the web of the H-shaped section 104 and receives the threaded end of a knurled clamping screw 108 which screw passes through a square washer 109 slidably mounted in the lower channel of the H-shaped section while the scale 106 is provided with a threaded aperture into which the threads of the knurled clamping screw are threadedly received whereby the scale 106 can be clamped in proper position. The cross slide 101 is provided with a recess which receives an L-shaped zero index bracket 110 suitably secured by one or more screws to the cross slide and having a zero index for cooperation with the scale 106 to facilitate the accurate positioning of the cross slide with respect to the base.

To obtain accurate guiding action of the cross slide, a tapered gib 111 is slidably mounted between the left downwardly extending portion of the cross slide and the upstanding guide rib 102 of the base and such tapered gib is adjusted by means of adjusting screw 112. The head 113 of such screw cooperates with a shoulder 114 of the gib to produce the necessary longitudinal movement of the tapered gib to obtain the proper snug operating relation of the parts and to take up wear as it may occur. A similar adjusting screw may be provided at the other end to assure acccurate and fixed mounting of the gib with respect to the cross slide.

The transverse movement of the cross slide 101 is accomplished by cross feed screw 115. The cross feed screw is moved by dial 115A releasably secured to shaft 115 by clamping knob 115B and the position of the cross slide is determined by the position of scale 106 and the position of dial 115A with respect to stationary dial 115C secured to the base 14 by suitable screws. After the adjustment is completed a clamping action is obtained by means of a clamping plate 116 received in a recess 117 in an angle member 118 which is secured to the cross slide 101 by suitable screws and the lower flange of such angle member engages under the outer flange projection of the way 103A. The clamping plate 116 is caused to be moved to clamping position by a clamp screw 119 threaded into the vertical flange of the angle member 118 and provided with a handle 120 which is adjustably secured to the clamp screw 119 so that less than 180° of movement of the handle 120 will cause the clamp plate 116 to become operative or inoperative while a limiting stop in the form of a screw 121 prevents the handle 120 from striking the base 14 in the loosened condition of the clamp plate 116. A similar clamp plate 116 with operating handle 120 is provided on the other side of the cross slide 101 and it will be noted that such clamping action does not affect the lateral adjustment or the position of the cross slide.

The table 100 is provided with a dovetail groove which receives the upstanding dovetail tongue 122 which is of less width than the width of the groove and the remaining space is taken up by a tapered gib 123 of parallelogram cross section and such tapered gib is adjusted by an adjusting screw 124 threadedly mounted in the table and which screw 124 is similar to adjusting screw 112. The tapered gib 123 cooperates with the tapered surface on the table 100 assuring a snug, accurate guiding action of the longitudinally movable table 100 as such table is moved by its feed screw 125.

The table feed screw 125 is provided with an enlarged portion forming a shoulder 126 which cooperates with the inner end of a bushing 127 mounted in a retaining hub 128 secured in place by suitable bolts to the end of the cross slide 101. The hub 128 carries a zero index flange 129 and also supports a roller bearing retaining hub 130. The extension of feed screw 125 includes a first threaded portion on which adjusting disks 131 and 132 are threaded and by proper adjustment the end play of shaft 125 is controlled by the shoulder 126 abutting the inner end of bushing 127 and the adjusting disk 131 abutting the roller bearing retainer 130. Rotatably mounted on a further reduced portion of the feed shaft 125 is a dial 133 having a flange 134 with graduations thereon for cooperation with the fixed index flange 129 and said dial 133 is adjustably secured to the feed shaft by a knurled adjusting knob 135 threaded on a further reduced portion of the feed shaft so that upon clamping action of the knob 135 the dial 133 is pressed tightly against adjusting disk 132 and rotates with the shaft so that the angular displacement of the graduations on the dials indicate the extent of movement of the table 100.

A hand wheel 136 is rotatably mounted on a further reduced portion of the feed shaft and cooperates with a clutch element 137 keyed to while being slidable on the shaft 125. A clamping knob 138 is threaded on a further reduced portion of the shaft and serves to urge the hub of the hand wheel 136 against the clutch element 137 whereby the hand wheel may cause rotation of the feed screw or be freely rotatable thereon.

To retain the feed table 100 in adjusted position, a clamp operating handle 139 operates a screw which is threaded in a block 140 fixed to a forward extension of the cross slide by any suitable means. A plate 141 serving as a clamp element has its stem received in an axial bore in the inner end of the screw so that rotation of the handle 139 and the screw causes the plate to be urged toward the body of the cross slide 101. Supported on the table 101 is a downwardly extending bar 142 having a reduced central portion with the bottom edge engageable with the plate 141 and between such bar 142 and the cross slide 101 is an abutment button 143 mounted on the cross slide. It should be apparent that clamping action occurs by the movement of plate 141 by the screw operated by handle 139 engages bar 142 and the reaction against the abutment button 143 results in a non-influencing clamping action of the table.

To indicate the position of the table, a scale 144 of triangular cross section is secured to the front of the table above the clamping bar 142 and an index angled member 145 is adjustably mounted on the upper portion of block 140 by means of a screw 146 passing through an elongated slot in the horizontal plate of the L-shaped member 145, the upstanding portion of such L-shaped member having a zero index mark thereon.

It will be apparent that optical means may be provided for measuring the displacement of the cross slide of the table and such optical arrangement may take the form shown in application Serial No. 26,736, filed May 4, 1960, or the form shown in application Serial No. 14,073, filed March 10, 1960, or combination of such optical arrangements.

From the above description it is believed that the operation of the jig borer should be obvious. The structure which provides for ease of assembly, permits reduced cost of production by providing for high precision work. The driving structure for the spindle is substantially independent of the support for the spindle, and provides safe means for obtaining different speeds of of operation. The feed provides for long life because of the use of positive clutch elements on low speed operating parts resulting in small impact force.

The adjustable gibs assure accurate guiding of the parts and the arrangement of scales assures accurate positioning during use while the clamps secure the cross slide and table without influencing the adjustment previously made. Consequently the position of the parts can be accurately determined by the reading of the scales 106, 144 and dials 115A and 134.

It will be apparent that various changes may be made within the spirit of the invention as defined by the valid scope of the claims.

What is claimed is:

1. A drive mechanism for the feed shaft of a jig borer having a transmission quill housing and spindle comprising a feed shaft, a hollow drive shaft slidably receiving said feed shaft, means for preventing relative rotation therebetween, a bearing support member rotatably supporting said drive shaft and preventing axial movement thereof, means for selectively driving said drive shaft from said transmission, said feed shaft extending downwardly into said quill housing, a pair of generally parallel shafts rotatably mounted within said housing, intermeshing gears carried by said parallel shafts and said feed shaft, a worm fixed to each of said parallel shafts, said worms having opposite threads, a worm gear meshing with each of said worms, said worm gears being freely rotatable on a shaft, clutch means slidably carried by said shaft and selectively engageable with said worm gears, means on said shaft for moving said spindle in a generally vertical direction, whereby said spindle may be selectively raised or lowered by said transmission.

2. A disconnectable gear train for driving a take-off shaft from a main shaft comprising a driven gear on said take-off shaft and a driving gear mounted on said main shaft, said driven gear and said driving gear being offset vertically and horizontally from each other, a first intermediate gear engageable with said driving gear, a second intermediate gear spaced from said first intermediate gear and engageable with said driven gear, said intermediate gears being fixed together and being rotatable about an axis spaced from said main and take-off shafts, means to shift said intermediate gears selectively axially into and out of engagement with said driving and driven gears, means to limit the axial movement of said intermediate gears, said take-off shaft being tubular and of substantial length, said take-off shaft having keys received within key receiving slots of a cooperating shaft to permit the cooperating shaft to telescope within said tubular take-off shaft.

3. A reversing gear for the fine adjusting shaft of a jig borer comprising a skeleton frame having a top and a bottom, a plurality of side plates removably mounted on said frame, said top having three bearings and said bottom having two bearings in alignment with two of said three bearings in said top, a first shaft extending through said top and being rotatably supported by the bearing which is not in alignment, a first gear fixed to said first shaft, a pair of second shafts rotatably supported by said aligned bearings, second and third gears fixed to each of said second shafts, said second gears meshing with said first gear for rotating said second gears in the same direction, said third gears having threads disposed in opposite directions, a fine adjusting shaft extending into said frame, a pair of fourth gears freely rotatably mounted on said fine adjusting shaft in spaced relation to each other, said fourth gears having teeth disposed in opposite directions and meshing with said third gears, slidable clutch means keyed to said fine adjusting shaft between said fourth gears, and manual means for shifting said clutch means whereby either of said fourth gears can be selectively engaged to drive said fine adjusting shaft.

References Cited by the Examiner

UNITED STATES PATENTS

| | | | |
|---|---|---|---|
| Re. 23,213 | 3/50 | Haefeli | 74—15.4 |
| 1,216,689 | 2/17 | Hey | 74—625 X |
| 1,352,800 | 9/20 | Etchison | 74—342 |
| 1,660,137 | 2/28 | Robinson et al. | 74—611 |
| 1,687,202 | 10/28 | Haines | 74—611 X |
| 2,082,260 | 6/37 | Reid | 74—216.5 |
| 2,131,973 | 10/38 | Rusnak et al. | 77—63 |
| 2,202,878 | 6/40 | Tantz | 74—611 |
| 2,314,549 | 3/43 | Milbrath | 74—376 |
| 2,396,733 | 3/46 | Wiken et al. | 74—625 X |
| 2,506,514 | 5/50 | McKelvey | 74—216.5 |
| 2,549,490 | 4/51 | Kuhl. | |
| 2,585,114 | 2/52 | Gredell | 74—376 |
| 2,682,182 | 6/54 | Armitage | 77—4 |
| 2,706,544 | 4/55 | Schuman | 192—4 X |
| 2,825,242 | 3/58 | Lowry | 74—611 |
| 2,826,945 | 3/58 | Kleinsorge | 77—4 |
| 2,838,967 | 6/58 | Meyer | 77—63 |
| 2,905,028 | 9/59 | Massari | 77—4 |
| 2,931,253 | 4/60 | Budney et al. | 77—4 |
| 2,947,197 | 8/60 | Pettigrew et al. | 74—611 |

FOREIGN PATENTS

| | | |
|---|---|---|
| 627,261 | 6/27 | France. |

DON A. WAITE, *Primary Examiner.*

FRANK E. BAILEY, BROUGHTON G. DURHAM, *Examiners.*